(12) United States Patent
Schiffler

(10) Patent No.: US 8,724,782 B2
(45) Date of Patent: May 13, 2014

(54) SYSTEM OF SUBSIDIZED PHONE CALLS

(76) Inventor: Jean-Marc Schiffler, São Paulo (BR)

(*) Notice: Subject to any disclaimer, the term of this patent is extended or adjusted under 35 U.S.C. 154(b) by 0 days.

(21) Appl. No.: 13/129,625

(22) PCT Filed: May 29, 2009

(86) PCT No.: PCT/BR2009/000146
§ 371 (c)(1),
(2), (4) Date: Sep. 6, 2011

(87) PCT Pub. No.: WO2010/057281
PCT Pub. Date: May 27, 2010

(65) Prior Publication Data
US 2011/0311035 A1 Dec. 22, 2011

(30) Foreign Application Priority Data

Nov. 18, 2008 (BR) ..................................... 0804908

(51) Int. Cl.
*H04M 15/00* (2006.01)
(52) U.S. Cl.
USPC ................ 379/114.13; 379/114.22; 705/14.4; 705/14.7
(58) Field of Classification Search
USPC .......... 379/111, 112.01, 114.01, 115.01, 140, 379/154, 155, 114.13, 114.2, 114.22; 705/14.4, 14.55, 14.56, 14.13, 14.14, 705/14.19, 14.7
See application file for complete search history.

(56) References Cited

U.S. PATENT DOCUMENTS

| | | | |
|---|---|---|---|
| 4,850,007 A * | 7/1989 | Marino et al. ........... | 379/114.13 |
| 5,333,186 A | 7/1994 | Gupta | |
| 5,448,625 A * | 9/1995 | Lederman .................. | 379/88.25 |
| 5,987,424 A * | 11/1999 | Nakamura ................. | 705/14.39 |
| 6,009,150 A | 12/1999 | Kamel | |
| 6,301,342 B1 * | 10/2001 | Ander et al. ............. | 379/114.13 |
| 6,492,437 B1 * | 12/2002 | Musa et al. .................. | 523/456 |
| 6,493,437 B1 * | 12/2002 | Olshansky ............... | 379/114.13 |
| 6,947,531 B1 * | 9/2005 | Lewis et al. .............. | 379/114.13 |
| 2004/0240646 A1 * | 12/2004 | O'Donnell ................. | 379/114.2 |
| 2007/0244752 A1 * | 10/2007 | Bayne ............................. | 705/14 |
| 2009/0265220 A1 * | 10/2009 | Bayraktar et al. .............. | 705/10 |

FOREIGN PATENT DOCUMENTS

| | | |
|---|---|---|
| EP | 0946061 A2 | 9/1999 |
| WO | WO 98/36585 | 8/1998 |
| WO | WO 01/05133 | 1/2001 |

* cited by examiner

*Primary Examiner* — Binh Tieu
(74) *Attorney, Agent, or Firm* — McKee, Voorhees & Sease, P.L.C.

(57) ABSTRACT

System of subsidized phone calls, is essentially a system (S) made possible by means of telecommunication networks in general to be used with great efficiency, using the existent technical resources that, organized of new way, allows the execution of calls with part or all of the chargeable time subsidized by a sponsor through the sending of advertising and/or institutional messages to the calling subscriber.

9 Claims, 1 Drawing Sheet

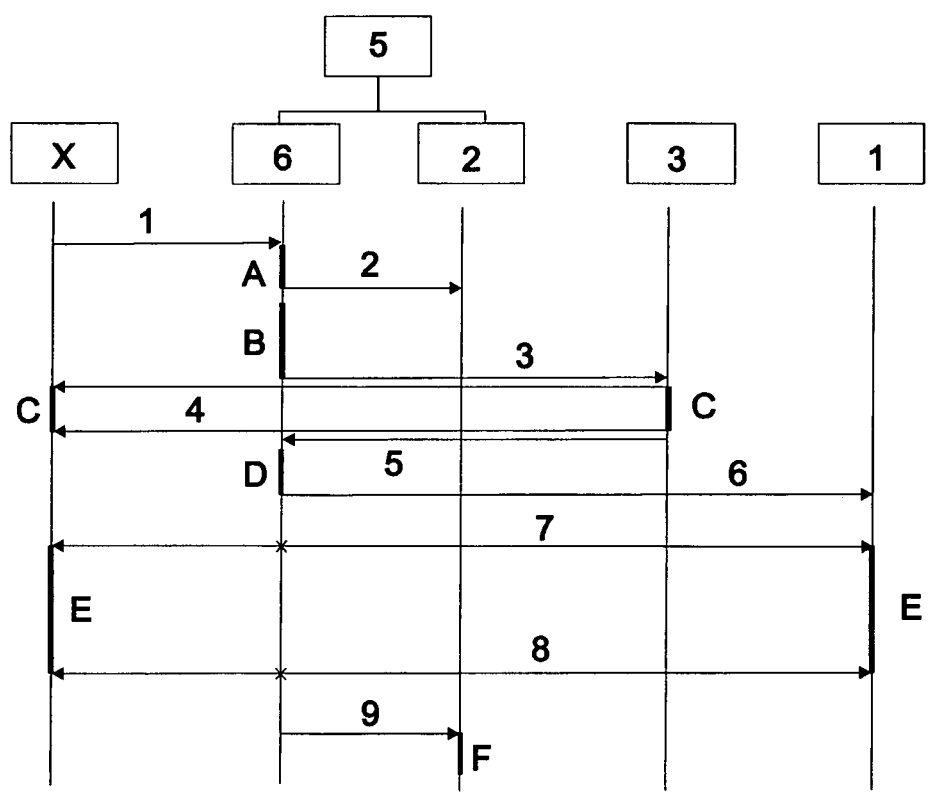

SYSTEM OF SUBSIDIZED PHONE CALLS

CROSS-REFERENCE TO RELATED APPLICATIONS

This is a National Phase application claiming priority to PCT/BR2009/000146 filed May 29, 2009, which claims priority to PI-0804908-4 filed Nov. 18, 2008, all of which are herein incorporated by reference in their entireties.

This patent of invention application refers to a unique "SYSTEM OF SUBSIDIZED PHONE CALLS", especially a system enabled by cell phone to be used with great efficiency, using the technical resources existent in telecommunication networks that, organized of new way, allows the realization of calls with some or all of the chargeable time subsidized by a sponsor through the sending of advertising and/or institutional messages to the calling subscriber.

It is known that currently, due to globalization and other factors, such as the spread of technologies, the competition in various segments of the economy has become fiercer, forcing companies to invest in optimization of products, processes and facilities.

The technology known in the telecommunications network does not allow the subscriber perform calls without the payment of part or all of the tariffed time. The exception is the calls to emergency numbers, such as the number 190 (police) or Brazilian non-geographic codes with the prefix 0800. A resource that can be used for calls with no cost is the call to be charged, denominated the charge of direct dial (Brazilian DDC) which depends on the consent of the called number.

The state of the art forward documents to measure the pricing of telephone calls, identify the number called, as PI0401273-9—"system for control and immediate information to the originator user of the actual cost of telephone calls." It comprehends the solution for a world problem that is the watching in real-time and reliability in the collection system of the operator companies of fixed and mobile telephony.

Aware of the lack in the state of the art, the inventor, after researches and studies, created the system in subject, which makes use of technical resources existent in telecommunication networks, but organized of new way, enabling the implementation of new calls with some or all of the tariffed time paid by a sponsoring entity in return to the sending of messages, commercial, advertising, promotional or institutional announcements to the calling subscriber.

The invented system provides a number of advantages related to the known systems, being the most preponderant the subsidy of the call, as well as the increasing of the MOU of the subscriber basis who not uses so much the telecommunication systems.

Below, the invention is explained with reference to the single flowchart attached.

The "SYSTEM OF SUBSIDIZED PHONE CALLS", object of this request for application of a patent of invention, consists essentially of a system (S) enabled through telecommunication networks in general to be used with great efficiency, using the existent technical resources, that organized of new way, allows the execution of calls with some or all of the tariffed time subsidized by a sponsor through the sending of advertising and/or institutional messages to the calling subscriber.

The system (S) comprises basically the calling subscriber (X), the commutation center (5) of the operator, where occurs the direction (5) and the charging (2) of the call, the messages platform (3) and the called subscriber (1). More particularly, the system (S) uses a service code of the operator, in a specific format, for instance, *abc, to direct the call to route of promotional message. In a first step, the system (S) is activated by the calling subscriber (X) with the dialing of the service code of the operator concatenated with the number of the called subscriber (1). The commutation center (5), when receive the service code, identifies the subscriber as a pre-paid (a) and activates a pre-paid platform to prepare the charging of the call (2). In sequence, the commutation center (5), based on analysis of the service code (b), forwards the call to the route of the message platform (3). The message platform (3) based on the identifier "c" of the service code, and eventually also based on time of day, day of week and type of day (weekend, holiday), select the right message/commercial, advertising, promotional or corporate announcement for the sending (4) to the calling subscriber (c). At the end of the message, the message platform returns the control of the call to the commutation center (5) which then executes the direction of the call (6) on the basis of the number of the called subscriber (d) which was indicated, concatenated to the service code, by the calling subscriber when the activation of the process. If the called subscriber is free, the commutation center (5) establishes the connection between the calling and the called subscribers (7) and thus the two subscribers may initiate the conversation (e). The end of the call, marked by the replacement of one of the two subscribers, makes the commutation center liberates the connection in both directions (8). In sequence, the commutation center (5) informs the pre-pay platform the total time of the call, already reduced the sponsored, defined by the sponsor, so that liquid time is deducted from credits that the calling subscriber may have available. Thus, the calling subscriber enjoys the advantage of having part or all of the chargeable time of the call, depending on the duration of the call, paid by the sponsor. If the facility is extended to post-paid subscribers and telecommunication networks in general, the commutation center will not need to involve the pre-paid platform, or the controls (2) and (9) will not be executed, ending the process (f). The sponsored time will be deducted from the tariffed time during the processing of the subscriber's account based on the service code of this call.

The invention claimed is:

1. A method of making subsidized phone calls comprising:
   using the resources existent in the telecommunication network to make a phone call with some or all tariffed communication between a calling subscriber and a called subscriber paid by a sponsoring entity without the need for the calling subscriber to preregister, wherein the calling subscriber initiates the phone call to the called subscriber by dialing a single concatenated phone number, the concatenated phone number including a service code and the called subscriber's phone number, wherein the service code represents an address of a network platform;
   in return and with the calling subscriber's approval, sending the calling subscriber a message, commercial, advertising, promotional or institutional announcement of the sponsor, wherein the message, commercial, advertising, promotional or institutional announcement is played in its entirety to the calling subscriber before connecting the phone call to the called subscriber, and wherein the message, commercial, advertising, promotional or institutional announcement is not played during the phone call between the calling subscriber and the called subscriber.

2. The method of making subsidized phone calls according to claim 1, characterized by using as resources a service code of the operator, a procedure for activation of the system;

procedure for deduction of chargeable time of a call, the sponsored time; a message platform and the messages of commercial, advertising, promotion announcement, by voice, text or multimedia.

3. The method of making subsidized phone calls according to claim 1, characterized by being identified by a service code of the operator in a pre-defined format, where it is possible to define different routes depending on the value of "c".

4. The method of making subsidized phone calls according to claim 3, characterized by a preferred format *abc.

5. The method of making subsidized phone calls according to claim 1, characterized by being activated by the dialing, by the calling subscriber, of the service code of the operator concatenated with the called subscriber number that can be a local, national (DDD) or international (DDI) number.

6. The method of making subsidized phone calls according to claim 1, characterized by directing the traffic based on the service code of the operator to a message platform connected to one or more commutation centers of the network that will answer the call and send to the calling subscriber a message, commercial, advertising, promotional or institutional announcement by voice, text or multimedia, for a fixed time.

7. The method of making subsidized phone calls, according to claim 1, characterized by having a procedure to deduce, during the processing of the subscriber's account, the total time of sponsored time, based on the service code, the total chargeable time of the calls made to post-paid subscribers and telecommunication networks in general.

8. The method of making subsidized phone calls according to claim 1, characterized by the using of a message platform that allows the association, for each possible value of the element "c" of the service code of the operator, of a message, commercial, advertising, promotional or institutional announcement, according to time of day, day of week and special days such as weekends and holidays, besides to send the message, business, advertising, promotional or institutional announcements according to the programming, at the end of this message, the message platform forwards the call to the number the called subscriber indicated in the procedure of activation, controlling the whole process of direction or, if the network which is connected to the support mechanism for returning the control of the direction of the call and make use of the appropriate signaling system, returning the control of the direction to the network.

9. The method of making subsidized phone calls according to claim 1, characterized by using messages, commercial, advertising, promotional or institutional announcements by voice, text, or multimedia, with a fixed duration, delivered by the messages platform before forwarding the call to the called subscriber indicated in the procedure of activation.

* * * * *